United States Patent
Huang (10) Patent No.: US 9,477,282 B2
(45) Date of Patent: Oct. 25, 2016

(54) POWER SOURCE EQUIPMENT AND POWER SUPPLY METHOD THEREOF

(71) Applicant: ACCTON TECHNOLOGY CORPORATION, Hsinchu (TW)

(72) Inventor: Wei-Hsiang Huang, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 14/640,001

(22) Filed: Mar. 5, 2015

(65) Prior Publication Data

US 2015/0355701 A1  Dec. 10, 2015

(30) Foreign Application Priority Data

Jun. 5, 2014  (TW) ............................. 103119586 A (51) Int. Cl.
  G06F 12/00   (2006.01)
  G06F 1/26    (2006.01)
  H04L 12/10   (2006.01)

(52) U.S. Cl.
  CPC .............. *G06F 1/266* (2013.01); *H04L 12/10* (2013.01)

(58) Field of Classification Search
  CPC ...... H04L 12/10; H04L 49/351; H04L 49/40
  USPC ................... 711/103, 100; 713/321, 320, 300
  See application file for complete search history.

(56) References Cited

U.S. PATENT DOCUMENTS

| | | | | |
|---|---|---|---|---|
| 7,441,133 B2* | 10/2008 | Giat | ........................ | H04L 12/10 713/300 |
| 8,171,315 B2* | 5/2012 | Karam | ..................... | H04L 12/10 713/300 |
| 8,352,754 B2* | 1/2013 | Chin | ........................ | H04L 12/10 713/300 |
| 8,583,945 B2* | 11/2013 | Tran | .......................... | G06F 1/26 713/300 |
| 2008/0114997 A1* | 5/2008 | Chin | ........................ | H04L 12/10 713/321 |
| 2010/0003860 A1* | 1/2010 | Mateo Ferrus | ......... | H04L 12/10 439/668 |

FOREIGN PATENT DOCUMENTS

| | | |
|---|---|---|
| CN | 101116285 A | 1/2008 |
| WO | 2007/070473 A1 | 6/2007 |

* cited by examiner

*Primary Examiner* — Pierre-Michel Bataille
(74) *Attorney, Agent, or Firm* — CKC & Partners Co., Ltd.

(57) ABSTRACT

A power supply method includes providing a plurality of output powers to a plurality of power devices (PDs); acquiring a plurality of power statuses of the PDs (power devices); calculating a summation of the output powers provided to the PDs (power devices); determining whether the summation of the output powers exceeds a predetermined threshold; and under a condition that the summation of the output powers exceeds the predetermined threshold, adjusting the output powers provided to the PDs (power devices) based upon the power statuses of the PDs (power devices).

15 Claims, 5 Drawing Sheets

POWER SOURCE EQUIPMENT AND POWER SUPPLY METHOD THEREOF

RELATED APPLICATIONS

This application claims priority to Taiwanese Application Serial Number 103119586, filed Jun. 5, 2014, which is herein incorporated by reference.

BACKGROUND

1. Field of Invention

The present disclosure relates to an electronic device. More particularly, the present disclosure relates to a power source equipment and a power supply method thereof.

2. Description of Related Art

With advances in information technology, power over Ethernet (PoE) technology is widely used in various kinds of network systems.

A typical PoE (power over Ethernet) system includes a power source equipment (PSE) and power devices (PDs). The PSE (power source equipment) is configured to provide powers to the PDs (power devices) via a twisted pair cable. With the foregoing configuration, it is not necessary to equip an independent local power source for each of the PDs (power devices) such that the network system can have an expanded number of applications.

However, the load capacity of the PSE (power source equipment) is limited by it's physical restriction (e.g., the PSE (power source equipment) may be damaged by excessive current when simultaneously providing powers to a large amount of PDs (power devices)). Thus, an important area of research in this field involves ways in which to flexibly provide powers to the PDs (power devices) on the basis of actual requirements.

SUMMARY

One aspect of the present disclosure is related to a power source equipment (PSE). In accordance with one embodiment of the present disclosure, the PSE (power source equipment) includes a plurality of network connection ports and a control module. The network connection ports respectively and electrically connected to a plurality of power devices (PDs), and separately providing a plurality of output powers to the PDs (power devices). The control module is for acquiring a plurality of power statuses of the PDs (power devices); calculating a summation of the output powers provided to the PDs (power devices) from the network connection ports; determining whether the summation of the output powers exceeds a predetermined threshold; and under a condition that the summation of the output powers exceeds the predetermined threshold, separately adjusting the output powers provided to the PDs (power devices) based upon the power statuses of the PDs (power devices).

In accordance with one embodiment of the present disclosure, the control module is configured for receiving a plurality of link layer discovery protocol (LLDP) packets from the PDs (power devices) through the network connection ports, and acquiring the power statuses of the PDs (power devices) separately according to the LLDP (link layer discovery protocol) packets.

In accordance with one embodiment of the present disclosure, the control module is further configured for determining whether the PDs (power devices) have local power sources to separately adjust the output powers provided to the PDs (power devices) from the network connection ports.

In accordance with one embodiment of the present disclosure, the control module is further configured for stopping a corresponding one of the network connection ports from providing one of the output powers to the one of the PDs (power devices) under a condition that one of the PDs (power devices) has a local power source.

In accordance with one embodiment of the present disclosure, the PSE (power source equipment) further includes a non-volatile memory and a memory unit. The non-volatile memory is configured to store a system configuration file. The control module further includes a chipset. The chipset is configured to control the network connection ports to provide the output powers to the PDs (power devices). The control module is further configured for storing a chipset default configuration in the memory unit, reading the system configuration file to acquire a user PoE (power over Ethernet) configuration, updating the chipset default configuration in the memory unit according to the user PoE (power over Ethernet) configuration, and writing the updated chipset default configuration into the chipset.

Another aspect of the present disclosure is related to a power supply method. In accordance with one embodiment of the present disclosure, the power supply method includes providing a plurality of output powers to a plurality of PDs (power devices); acquiring a plurality of power statuses of the PDs (power devices); calculating a summation of the output powers provided to the PDs (power devices); determining whether the summation of the output powers exceeds a predetermined threshold; and under a condition that the summation of the output powers exceeds the predetermined threshold, separately adjusting the output powers provided to the PDs (power devices) based upon the power statuses of the PDs (power devices).

In accordance with one embodiment of the present disclosure, the step of acquiring the power statuses of the PDs (power devices) includes receiving a plurality of LLDP (link layer discovery protocol) packets from the PDs (power devices) and acquiring the power statuses of the PDs (power devices) separately according to the LLDP (link layer discovery protocol) packets.

In accordance with one embodiment of the present disclosure, the step of adjusting the output powers provided to the PDs (power devices) according to the power statuses of the PDs (power devices) includes determining whether the PDs (power devices) have local power sources to separately adjust the output powers provided to the PDs (power devices).

In accordance with one embodiment of the present disclosure, the step of determining whether the PDs (power devices) have local powers and respectively adjusting the output powers provided from the network connection ports to the PDs (power devices) includes determining whether the PDs (power devices) have local powers, and under a condition that one of the PDs (power devices) has a local power, stopping a corresponding one of the network connection ports from providing one of the output powers to the one of the PDs (power devices).

In accordance with one embodiment of the present disclosure, the power supply method further includes storing a chipset default configuration in a memory unit, reading a system configuration file stored in a non-volatile memory to acquire a user PoE (power over Ethernet) configuration, updating the chipset default configuration in the memory unit according to the user PoE (power over Ethernet) configuration, and writing the updated chipset default configuration into the chipset, and controlling a plurality of network connection ports to provide the output powers to the PDs (power devices) through the chipset.

Another aspect of the present disclosure is related to a PSE (power source equipment). In accordance with one embodiment of the present disclosure, the PSE (power source equipment) includes a plurality of network connection ports, a chipset, and a control unit. The network connection ports are respectively and electrically connected to a plurality of PDs (power devices), and separately providing a plurality of output powers to the PDs (power devices). The chipset is electrically connected to the network connection ports. The control unit electrically connected to the chipset and is configured for controlling the chipset to control the network connection ports to provide the output powers to the PDs (power devices); controlling the chipset to acquire a plurality of power statuses of the PDs (power devices); calculating a summation of the output powers provided to the PDs (power devices) from the network connection ports; determining whether the summation of the output powers exceeds a predetermined threshold; and under a condition that the summation of the output powers exceeds the predetermined threshold, separately controlling the chipset to adjust the output powers provided to the PDs (power devices) based upon the power statuses of the PDs (power devices).

In accordance with one embodiment of the present disclosure, the control module is further configured for determining whether the PDs (power devices) have local power sources to separately adjust the output powers provided to the PDs (power devices) from the network connection ports.

In accordance with one embodiment of the present disclosure, the control module is further configured for controlling the chipset to stop a corresponding one of the network connection ports from providing one of the output powers to the one of the PDs (power devices) under a condition that one of the PDs (power devices) has a local power source.

By utilizing one embodiment described above, the PSE (power source equipment) can flexibly adjust the output powers provided to the PDs (power devices) according to the power statuses of the PDs (power devices). In such a manner, an intelligent power system can be realized.

DETAILED DESCRIPTION

Reference will now be made in detail to the present embodiments of the present disclosure, examples of which are illustrated in the accompanying drawings. Wherever possible, the same reference numbers are used in the drawings and the description to refer to the same or like parts.

One aspect of the present disclosure is related to a power source equipment (PSE). To facilitate the description to follow, a power over Ethernet (PoE) system defined by the IEEE 802.3af-2003 standard and/or the IEEE 802.3at-2009 standard will be used as a descriptive example to describe details of the present disclosure. However, the disclosure is not limited to the embodiment described below.

Figure 1:
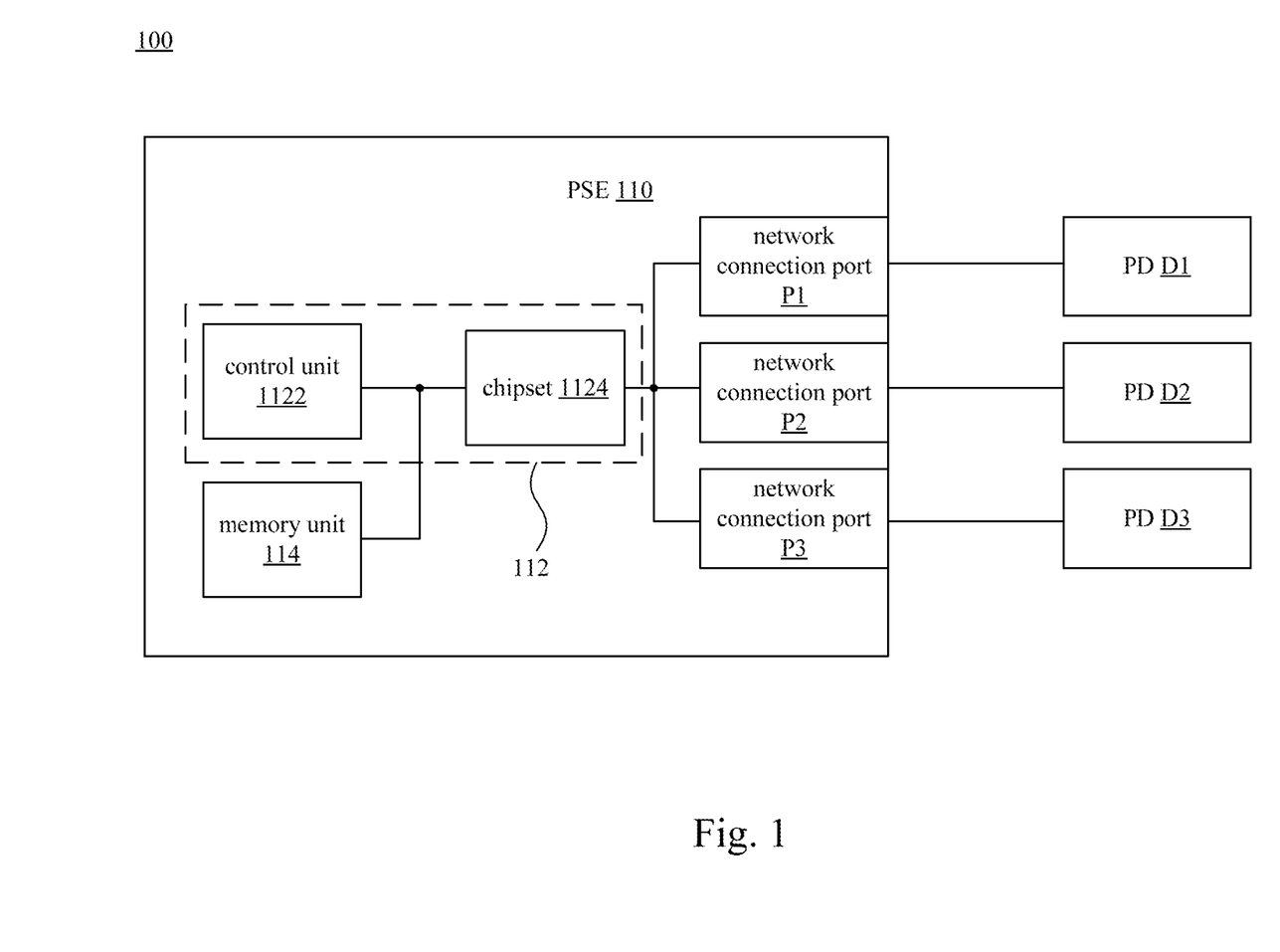
FIG. 1 is a schematic diagram of a network system according to one embodiment of the present disclosure.

FIG. 1 is a schematic diagram of a network system 100 according to one embodiment of the present disclosure. The network system 100 includes a PSE (power source equipment) 110 and power devices (PDs) D1-D3. In one embodiment, the PSE (power source equipment) 110 can be, for example, a network switch, and the PDs (power devices) D1-D3 can be, for example, wireless access points (APs). However, the disclosure is not limited to such an embodiment.

In one embodiment, the PSE (power source equipment) 110 includes a control module 112, a memory unit 114, and network connection ports P1-P3. The control module 112 is electrically connected to the memory unit 114 and the network connection ports P1-P3. The network connection ports P1-P3 are respectively and electrically connected to the PDs (power devices) D1-D3.

In this embodiment, the control module 112 includes a control unit 1122 and a chipset 1124. The chipset 1124 is electrically connected to the control unit 1122, the memory unit 114, and the network connection ports P1-P3. The control unit 1122 is electrically connected to the memory unit 114.

In one embodiment, the control unit 1122 can be realized by, for example, a central processor, a microprocessor, or another suitable calculating device. The memory unit 114 can be realized by, for example, a random access memory (RAM), a flash memory, an electrically erasable programmable read-only memory (EEPROM), or another suitable transient/non-transient computer readable medium.

It is noted that the quantities of the network connection ports P1-P3 and the PDs (power devices) D1-D3 described above are given for illustrative purposes. Other quantities are within the contemplated scope of the present disclosure. In addition, the connections among the elements in the PSE (power source equipment) 110 described above are given for illustrative purposes. Other connections are within the contemplated scope of the present disclosure. Any configuration of these devices and components, and interconnections thereamong that would enable the network system 100 to realize the technical features described below can be used herein.

In this embodiment, the control module 112 is configured to collect operating information of the network system 100 and store the operating information in the memory unit 114. After that, the control module 112 can control the network connection ports P1-P3 according to the operating information to flexibly provide output powers to the PDs (power devices) D1-D3.

In the following paragraphs, details of the present invention will be described with reference to a power supply method in FIG. 2. However, the invention is not limited to the embodiment described below.

It is noted that the power supply method can be applied to a PSE (power source equipment) having a structure that is the same as or similar to the structure shown in FIG. 1. To simplify the description below, in the following paragraphs, the embodiment shown in FIG. 1 will be used as an example to describe the power supply method according to one embodiment of the present disclosure. However, the present disclosure is not limited to application to the embodiment shown in FIG. 1.

In addition, it should be noted that, in the steps of the following power supply method, no particular sequence is required unless otherwise specified. Moreover, the following steps also may be performed simultaneously or the execution times thereof may at least partially overlap.

Furthermore, the steps of the following power supply method may be added, replaced, and/or eliminated as appropriate, in accordance with various embodiments of the present disclosure.

Figure 2:
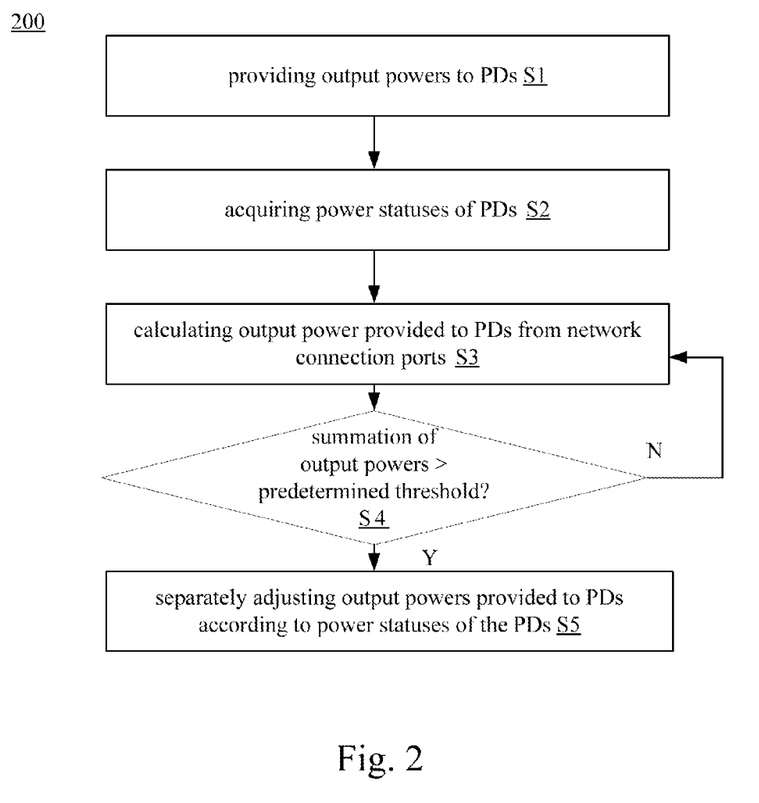
FIG. 2 is a flow chart of a power supply method according to one embodiment of the present disclosure.

FIG. 2 is a flow chart of a power supply method 200 according to one embodiment of the present disclosure. The power supply method 200 includes the steps below.

In step S1, the control module 112 uses the chipset 1124 to control the network connection ports P1-P3 to respectively provide output powers to the PDs (power devices) D1-D3. In one embodiment, the network connection ports P1-P3 provide output powers to the PDs (power devices) D1-D3, for example, through PoE (power over Ethernet) technology defined by the IEEE 802.3af-2003 standard and/or the IEEE 802.3at-2009 standard.

In step S2, the control module 112 uses the chipset 1124 to acquire power statuses of the PDs (power devices) D1-D3, and store the power statuses of the PDs (power devices) D1-D3 in the memory unit 114. For example, the control module 112 can use the chipset 1124 to receive link layer discovery protocol (LLDP) packets from the PDs (power devices) D1-D3 through the network connection ports P1-P3, and can use the chipset 1124 to separately acquire the power statuses of the PDs (power devices) D1-D3 according to the LLDP (link layer discovery protocol) packets.

Figure 3A:
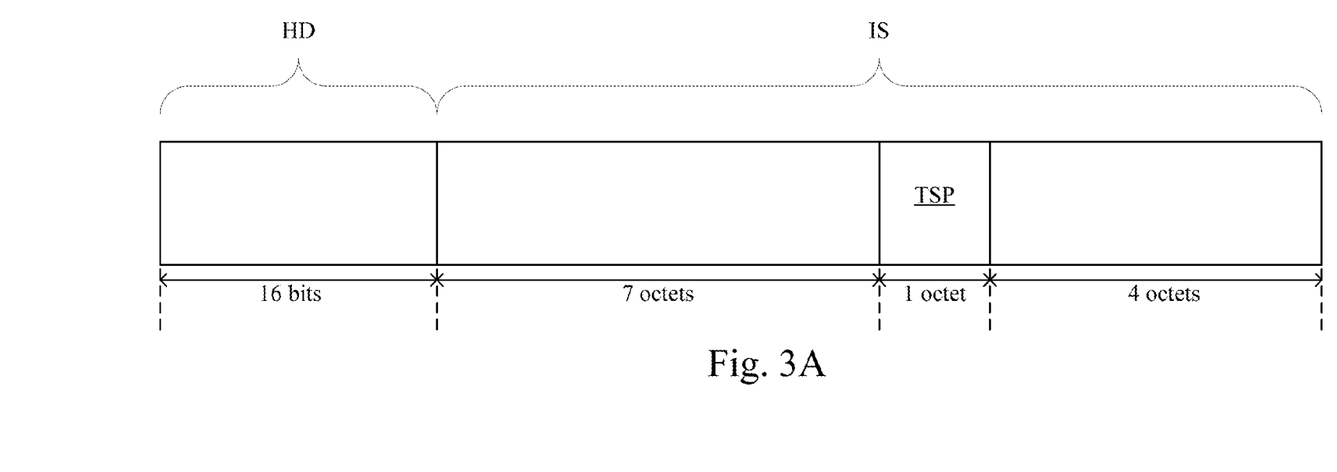
FIG. 3A illustrates a packet format of a link layer discovery protocol packet according to one embodiment of the present disclosure.

Referring to FIG. 3A, in one embodiment, each of the LLDP (link layer discovery protocol) packets includes a TLV header HD with a length of 16 bits and a TLV information string IS with a length of 12 octets. The TLV information string IS includes a type/source/priority field TSP with a length of 1 octet.

Figure 3B:
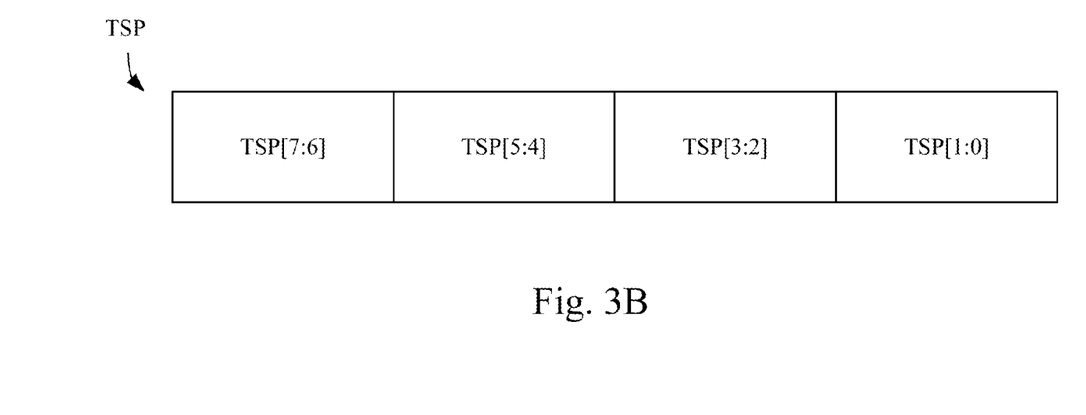
FIG. 3B illustrates a type/source/priority field in a link layer discovery protocol (LLDP) packet according to one embodiment of the present disclosure.

Referring to FIG. 3B, in the type/source/priority field TSP, the seventh and sixth bits (i.e., TSP[7:6]) indicate whether the device transmitting the particular LLDP (link layer discovery protocol) packet is a PSE (power source equipment) or a PD. Under a condition that the device transmitting the particular LLDP (link layer discovery protocol) packet is a PD, the fifth and fourth bits (i.e., TSP[5:4]) indicate whether this PD (power device) has a local power source. The third and second bits (i.e., TSP[3:2]) are reserved bits. The first and zero bits (i.e., TSP[1:0]) indicate a power priority of the device transmitting the particular LLDP (link layer discovery protocol) packet.

Through the packet format described above, the control module 112 can acquire the power statuses of the PDs (power devices) D1-D3.

In one embodiment, the power statuses of the PDs (power devices) D1-D3 include information indicating whether the PDs (power devices) D1-D3 have local power sources. When the PDs (power devices) D1-D3 have local power sources, even if the PSE (power source equipment) 110 does not provide powers to the PDs (power devices) D1-D3, the PDs (power devices) D1-D3 are still able to work based on the powers provided by the local power sources. On the other hand, when the PDs (power devices) D1-D3 do not have the local power sources, if the PSE (power source equipment) 110 does not provide powers to the PDs (power devices) D1-D3, the PDs (power devices) D1-D3 will be unable to work.

In step S3, the control module 112 uses the chipset 1124 to calculate a summation of the output powers provided to the PDs (power devices) D1-D3 from the connection ports P1-P3, and to store the summation of the output powers in the memory unit 114. In this embodiment, the control module 112 uses the chipset 1124 to calculate the summation of the output powers provided to the PDs (power devices) D1-D3 from the connection ports P1-P3 every predetermined time period (e.g., every two seconds). In one embodiment, the control module 112 uses the chipset 1124 to separately monitor and acquire the output powers provided to the PDs (power devices) D1-D3 from the network connection ports P1-P3, and to sum the output powers to acquire the summation of the output powers.

Subsequently, in step S4, the control module 112 uses the control unit 1122 to determine whether the summation of the output powers exceeds a predetermined threshold (e.g., 200 W). If so, step S5 is performed; if not, the procedure returns back to step S3.

In one embodiment, in step S4, the control module 112 can use the control unit 1122 to determine whether the summation of the output powers stored in the memory unit 114 is changed (i.e., to determine whether the present summation of the output powers is different from the previous summation of output powers), and to determine whether the output powers exceeds the predetermined threshold when the summation of the output powers is changed.

In step S5, under a condition that the summation of the output powers exceeds the predetermined threshold, the control module 112 uses the control unit 1122 to control the chipset 1124 to adjust the output powers provided to the PDs (power devices) D1-D3 from the network connection ports P1-P3 according to the power statuses of the PDs (power devices) D1-D3. In one embodiment, the predetermined threshold can be set as a safety margin of the summation of the output power of the PSE (power source equipment) 110 to avoid excessive current to damage the PSE (power source equipment) 110.

In one embodiment, in step S5, the control module 112 uses the control unit 1122 to determine whether the PDs (power devices) D1-D3 have local electrical power sources according to the power statuses of the PDs (power devices) D1-D3 stored in the memory unit 114, and accordingly uses the control unit 1122 to control the chipset 1124 to separately adjust the output powers provided to the PDs (power devices) D1-D3 from the network connection ports P1-P3.

In one embodiment, in step S5, when the summation of the output powers exceeds the predetermined threshold, if one of the PDs (power devices) D1-D3 has a local electrical power, the control module 112 can use the control unit 1122 to control the chipset 1124 to stop a corresponding one of the network connection ports P1-P3 from providing output power to this PD.

For example, under a condition that each of the network connection ports P1-P3 provides an output power of 70 W to the corresponding PD (power device) D1, D2, or D3 (the summation of the output powers in this case would be 70 W+70 W+70 W=210 W) and the predetermined threshold is equal to 200 W, if the PD (power device) D1 has a local electrical power source, the control module 112 can stop the network connection port P1 from providing an output power to the PD (power device) D1. In such a manner, the summation of output powers can be decreased to 140 W, such that power consumption can be reduced, and a decrease in the lifespan of the PSE (power source equipment) 110 caused by operating in heavy-loading conditions can be avoided.

In one embodiment, the control module 112 can determine whether the PDs (power devices) D1-D3 have local electrical power sources according to the LLDP (link layer discovery protocol) packets therefrom. For example, if the fifth and fourth bits TSP[5:4] of the LLDP (link layer discovery protocol) packets sent by the PD (power device) D1 is "11", the control module 112 determines the PD (power device) D1 has a local electrical power source.

In one embodiment, under a condition that the summation of the output powers exceeds the predetermined threshold and all of the PDs (power devices) D1-D3 have local electrical power sources, the control module 112 may stop at least one of the network connection ports P1-P3 providing an output power according to the power statuses of the PDs (power devices) D1-D3 stored in the memory unit 114. For example, when the PD (power device) D1 is labeled as an important device (e.g., the first and zeroth bits TSP[1:0] of the LLDP (link layer discovery protocol) packets sent by the PD (power device) D1 is "01", which indicates "critical"), the control module 112 may merely stop one or both of the network connection ports P2-P3 providing output power, and allow the network connection port P1 to continuously provide the output power to the PD (power device) D1.

In one embodiment, the control module 112 may determine priorities of the PDs (power devices) D1-D3 according to the power statuses of the PDs (power devices) D1-D3 stored in the memory unit 114, and accordingly stop the network connection ports P1-P3 providing output power in sequence.

In one embodiment, under a condition that the summation of the output powers exceeds the predetermined threshold and all of the PDs (power devices) D1-D3 have no local electrical power sources, the control module 112 may decrease at least one of the output powers provided by the network connection ports P1-P3 to a minimum operating power, which is the harvester power level below which the one of the PDs (power devices) D1-D3 do not operate, according to the power statuses of the PDs (power devices) D1-D3 stored in the memory unit 114. For example, when the minimum operating power of the PDs (power devices) D1-D3 are 40 W, the control module 112 may decrease at least one of the output powers provided by the network connection ports P1-P3 from a normal output power (e.g., 70 W) to 40 W.

Through the configuration described above, the PSE (power source equipment) 110 can flexibly adjust the output powers to the PDs (power devices) D1-D3 according to the power statuses of the PDs (power devices) D1-D3. In such a manner, an intelligent power system can be realized.

Another aspect of the present disclosure is related to a network system.

Figure 4:
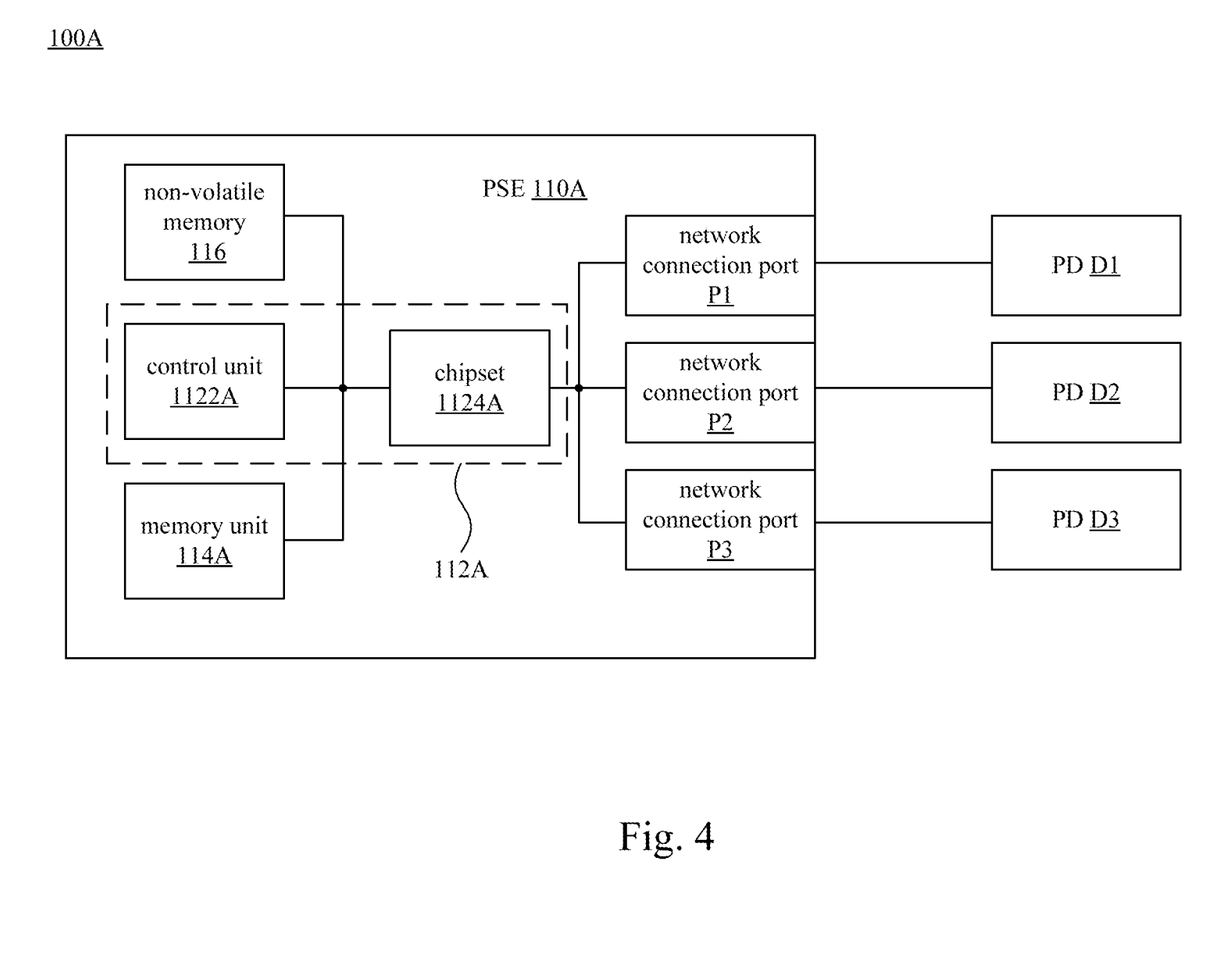
FIG. 4 is a schematic diagram of a network system according to one embodiment of the present disclosure.

FIG. 4 is a schematic diagram of a network system 100A according to one embodiment of the present disclosure. The network system 100A includes a PSE (power source equipment) 110A and PDs (power devices) D1-D3. In one embodiment, the PSE (power source equipment) 110A can be, for example, a network switch, and the PDs (power devices) D1-D3 can be, for example, wireless access points. However, the disclosure is not limited to such an embodiment.

In this embodiment, the PSE (power source equipment) 110A includes a control module 112A, a memory unit 114A, a non-volatile memory 116, and network connection ports P1-P3. The network connection ports P1-P3 are electrically connected to the PDs (power devices) D1-D3 respectively.

In this embodiment, the control module 112A includes a control unit 1122A and a chipset 1124A. The chipset 1124A is electrically connected to the control unit 1122A, the memory unit 114A, the non-volatile memory 116, and the network connection ports P1-P3. The control unit 1122A is electrically connected to the memory unit 114A and the non-volatile memory 116.

In this embodiment, the non-volatile memory 116 can be realized by, for example, a flash memory, an EEPROM, or another suitable non-transient computer readable medium. In addition, realizations of the control unit 1122A and the memory unit 114A can be ascertained by referring to the realizations of the control unit 1122 and the memory unit 114 in FIG. 1, and a description in this regard will not be repeated.

In this embodiment, the chipset 1124A is configured to control the network connection ports P1-P3 to provide output powers to the PDs (power devices) D1-D3.

In this embodiment, the control unit 1122A can perform operations in connection with the setup process of the chipset 1124 to reduce the setup time period of the chipset 1124A, and prevent unstable output powers from being provided to the PDs (power devices) D1-D3 from the network connection ports P1-P3 during the setup time period of the chipset 1124A.

In the following paragraphs, details of the present invention will be described with reference to a power supply method in FIG. 5. However, the invention is not limited to the embodiment described below.

It is noted that the power supply method can be applied to a PSE (power source equipment) having a structure that is the same as or similar to the structure shown in FIG. 4. To simplify the description below, in the following paragraphs, the embodiment shown in FIG. 4 will be used as an example to describe the power supply method according to one embodiment of the present disclosure. However, the present disclosure is not limited to application to the embodiment shown in FIG. 4.

In addition, it should be noted that, in the steps of the following power supply method, no particular sequence is required unless otherwise specified. Moreover, the following steps also may be performed simultaneously or the execution times thereof may at least partially overlap.

Furthermore, the steps of the following power supply method may be added, replaced, and/or eliminated as appropriate, in accordance with various embodiments of the present disclosure.

Figure 5:
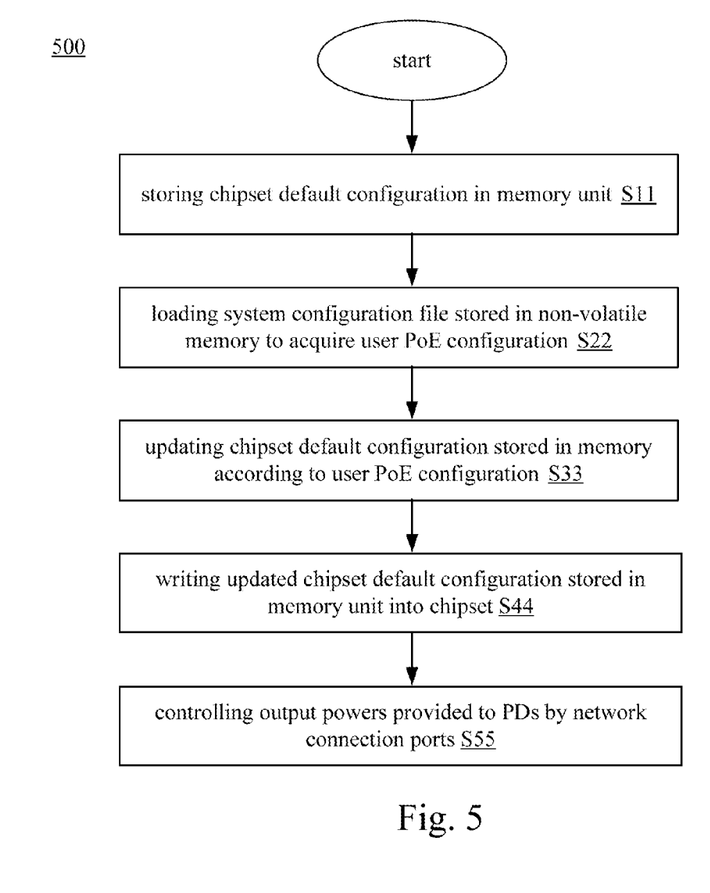
FIG. 5 is a flow chart of a power supply method according to one embodiment of the present disclosure.

FIG. 5 is a flow chart of a power supply method 500 according to one embodiment of the present disclosure. The power supply method 500 includes the steps below.

In step S11, the control unit 1122A stores a chipset default configuration in the memory unit 114A. In one embodiment, the chipset default configuration includes the default output powers of the PSE (power source equipment) 110, the statues of the PSE (power source equipment) 110, and other information. In one embodiment, when the PSE (power source equipment) 110 starts up, the PSE (power source equipment) 110 loads the chipset default configuration to get the default output powers and the information of itself.

In step S22, the control unit 1122A loads a system configuration file stored in the non-volatile memory 116 to acquire a user PoE (power over Ethernet) configuration. In one embodiment, the system configuration file contains the user PoE (power over Ethernet) configuration which includes user-configured output powers of the PSE (power source equipment) 110 and other user-configured information.

Subsequently, in step S33, the control unit 1122A updates the chipset default configuration stored in the memory unit 114A according to the user PoE (power over Ethernet) configuration. For example, when the default output powers of the network connection ports P1-P3 in the chipset default configuration are 70 W and the user-configured output powers of the network connection ports P1-P3 in user PoE (power over Ethernet) configuration are 45 W, the control unit 1122A can update the default output powers of the network connection ports P1-P3 in the chipset default configuration to 45 W.

Subsequently, in step S44, the control unit 1122A writes the updated chipset default configuration stored in the memory unit 114A into the chipset 1124A.

Subsequently, in step S55, the chipset 1124A controls output powers (e.g., 45 W) provided to the PDs (power devices) D1-D3 from the network connection ports P1-P3 according to the updated chipset default configuration (i.e., according to the updated default output power).

In some comparative approaches, the control unit separately writes the chipset default configuration and the user PoE (power over Ethernet) configuration into the chipset. Through such a double writing operation, the setup time period of the chipset is increased, and the output powers provided to the PDs (power devices) from the network connection ports may vary during the setup time period of the chipset, resulting in instability with respect to the supply of power.

In contrast, in the embodiments of the invention, the control unit 1122A integrates the chipset default configuration and the user PoE (power over Ethernet) configuration and subsequently writes the integrated configuration into the chipset 1124A, such that the setup time period of the chipset 1124A can be reduced, and unstable output powers provided to the PDs (power devices) D1-D3 from the network connection ports P1-P3 can be avoided.

In addition, it is noted that, in some embodiments of the invention, the control module 112A, the control unit 1122A, the chipset 1124A, and the memory unit 114A can separately perform operations that are the same as or similar to the operations of the control module 112, the control unit 1122, the chipset 1124, and the memory unit 114 described above, such that the PSE (power source equipment) 110A can flexibly adjust the output powers to the PDs (power devices) D1-D3 according to the power statuses of the PDs (power devices) D1-D3. Details of these operations can be ascertained by referring to the paragraphs above, and a description in this regard will not be repeated herein.

Although the present disclosure has been described in considerable detail with reference to certain embodiments thereof, other embodiments are possible. Therefore, the scope of the appended claims should not be limited to the description of the embodiments contained herein.

What is claimed is:

1. A power supply method comprising:
providing a plurality of output powers to a plurality of PDs (power devices);
acquiring a plurality of power statuses of the PDs (power devices);
calculating a summation of the output powers provided to the PDs (power devices);
determining whether the summation of the output powers exceeds a predetermined threshold; and
under a condition that the summation of the output powers exceeds the predetermined threshold, separately adjusting the output powers provided to the PDs (power devices) based upon the power statuses of the PDs (power devices),
wherein the step of adjusting the output powers provided to the PDs (power devices) based upon the power statuses of the PDs (power devices) comprises:
determining whether the PDs (power devices) have local power sources to separately adjust the output powers provided to the PDs (power devices).

2. The power supply method as claimed in claim 1 further comprising:
storing a chipset default configuration in a memory unit;
reading a system configuration file stored in a non-volatile memory to acquire a user PoE (power over Ethernet) configuration;
updating the chipset default configuration in the memory unit according to the user PoE (power over Ethernet) configuration;
writing the updated chipset default configuration into the chipset; and
controlling, through the chipset, a plurality of network connection ports to provide the output powers to the PDs (power devices).

3. The power supply method as claimed in claim 1, wherein the step of acquiring the power statuses of the PDs (power devices) comprises:
receiving a plurality of LLDP (link layer discovery protocol) packets from the PDs (power devices); and
acquiring the power statuses of the PDs (power devices) separately according to the LLDP (link layer discovery protocol) packets.

4. The power supply method as claimed in claim 3 further comprising:
storing a chipset default configuration in the memory unit;
reading a system configuration file stored in a non-volatile memory to acquire a user PoE (power over Ethernet) configuration;
updating the chipset default configuration in the memory unit according to the user PoE (power over Ethernet) configuration;
writing the updated chipset default configuration into the chipset; and
controlling, through the chipset, a plurality of network connection ports to provide the output powers to the PDs (power devices).

5. The power supply method as claimed in wherein the step of determining whether the PDs (power devices) have local powers and respectively adjusting the output powers provided from the network connection ports to the PDs (power devices) comprises:
determining whether the PDs (power devices) have local powers; and
under a condition that one of the PDs (power devices) has a local power, stopping a corresponding one of the network connection ports from providing one of the output powers to the one of the PDs (power devices).

6. The power supply method as claimed in claim 5 further comprising:
storing a chipset default configuration in the memory unit;
reading a system configuration file stored in a non-volatile memory to acquire a user PoE (power over Ethernet) configuration;
updating the chipset default configuration in the memory unit according to the user PoE (power over Ethernet) configuration;

writing the updated chipset default configuration into the chipset; and controlling, through the chipset, a plurality of network connection ports to provide the output powers to the PDs (power devices).

7. A power source equipment (PSE) comprising:
a plurality of network connection ports respectively and electrically connected to a plurality of power devices (PDs), and separately providing a plurality of output powers to the PDs (power devices); and
a control module for:
   acquiring a plurality of power statuses of the PDs (power devices);
   calculating a summation of the output powers provided to the PDs (power devices) from the network connection ports;
   determining whether the summation of the output powers exceeds a predetermined threshold; and
   under a condition that the summation of the output powers exceeds the predetermined threshold, separately adjusting the output powers provided to the PDs (power devices) based upon the power statuses of the PDs (power devices),
   wherein the control module is further for determining whether the PDs (power devices) have local power sources to separately adjust the output powers provided to the PDs (power devices).

8. The PSE (power source equipment) as claimed in claim 7 further comprising:
a non-volatile memory configured to store a system configuration file; and
a memory unit;
wherein the control module comprises:
   a chipset configured to control the network connection ports to provide the output powers to the PDs (power devices);
and the control module is further configured for:
   storing a chipset default configuration in the memory unit;
   reading the system configuration file to acquire a user power over Ethernet (PoE) configuration;
   updating the chipset default configuration in the memory unit according to the user PoE (power over Ethernet) configuration; and
   writing the updated chipset default configuration into the chipset.

9. The PSE (power source equipment) as claimed in claim 7, wherein the control module is further configured for:
receiving, through the network connection ports, a plurality of link layer discovery protocol (LLDP) packets from the PDs (power devices); and
acquiring the power statuses of the PDs (power devices) separately according to the LLDP (link layer discovery protocol) packets.

10. The PSE (power source equipment) as claimed in claim 9 further comprising:
a non-volatile memory configured to store a system configuration file; and
a memory unit;
wherein the control module comprises:
   a chipset configured to control the network connection ports to provide the output powers to the PDs (power devices);
and the control module is further configured for:
   storing a chipset default configuration in the memory unit;
   reading the system configuration file to acquire a user PoE (power over Ethernet) configuration;
   updating the chipset default configuration in the memory unit according to the user PoE (power over Ethernet) configuration; and
   writing the updated chipset default configuration into the chipset.

11. The PSE (power source equipment) as claimed in claim 7, wherein the control module is further configured for:
under a condition that one of the PDs (power devices) has a local power source, stopping a corresponding one of the network connection ports from providing one of the output powers to the one of the PDs (power devices).

12. The PSE (power source equipment) as claimed in claim 11 further comprising
a non-volatile memory configured to store a system configuration file; and
a memory unit;
wherein the control module comprises:
   a chipset configured to control the network connection ports to provide the output powers to the PDs (power devices);
and the control module is further configured for:
   storing a chipset default configuration in the memory unit;
   reading the system configuration file to acquire a user PoE (power over Ethernet) configuration;
   updating the chipset default configuration in the memory unit according to the user PoE (power over Ethernet) configuration; and
   writing the updated chipset default configuration into the chipset.

13. A PSE (power source equipment) comprising:
a plurality of network connection ports respectively and electrically connected to a plurality of PDs (power devices), and separately providing a plurality of output powers to the PDs (power devices);
a chipset electrically connected to the network connection ports;
a control unit electrically connected to the chipset, configured for:
   controlling the chipset to provide the output powers to the PDs (power devices) through the network connection ports;
   controlling the chipset to acquire a plurality of power statuses of the PDs (power devices);
   calculating a summation of the output powers provided to the PDs (power devices) from the network connection ports;
   determining whether the summation of the output powers exceeds a predetermined threshold; and
   under a condition that the summation of the output powers exceeds the predetermined threshold, separately controlling the chipset to adjust the output powers provided to the PDs (power devices) based upon the power statuses of the PDs (power devices),
   wherein the control unit is further configured for determining whether the PDs (power devices) have local power sources to separately adjust the output powers provided to the PDs (power devices) from the network connection ports.

14. The PSE (power source equipment) as claimed in claim 13, wherein the control unit is further configured for:
receiving, through the chipset and the network connection ports, a plurality of LLDP (link layer discovery protocol) packets from the PDs (power devices); and acquiring the power statuses of the PDs (power devices) separately according to the LLDP (link layer discovery protocol) packets.

15. The PSE (power source equipment) as claimed in claim 13, wherein the control unit is further configured for:
under a condition that one of the PDs (power devices) has a local power source, controlling the chipset to stop a corresponding one of the network connection ports from providing one of the output powers to the one of the PDs (power devices).

\* \* \* \* \*